March 6, 1956  J. C. RENAULT  2,737,103
SOIL CULTIVATING TOOL WITH QUICK-DETACHABLE POINT
Filed June 7, 1954
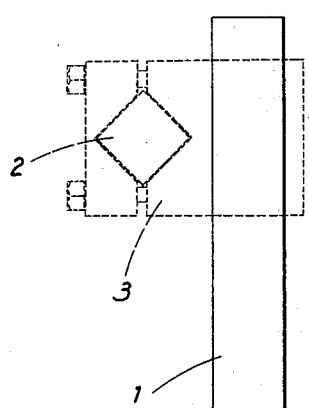
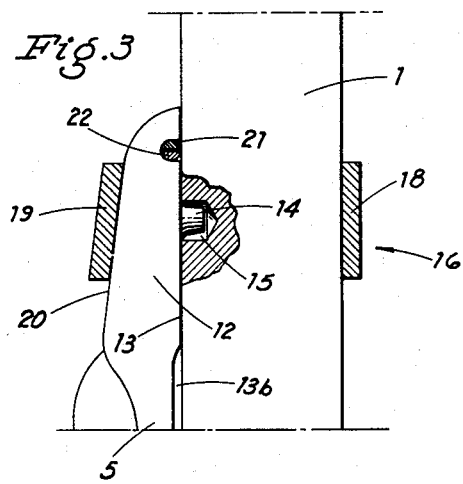
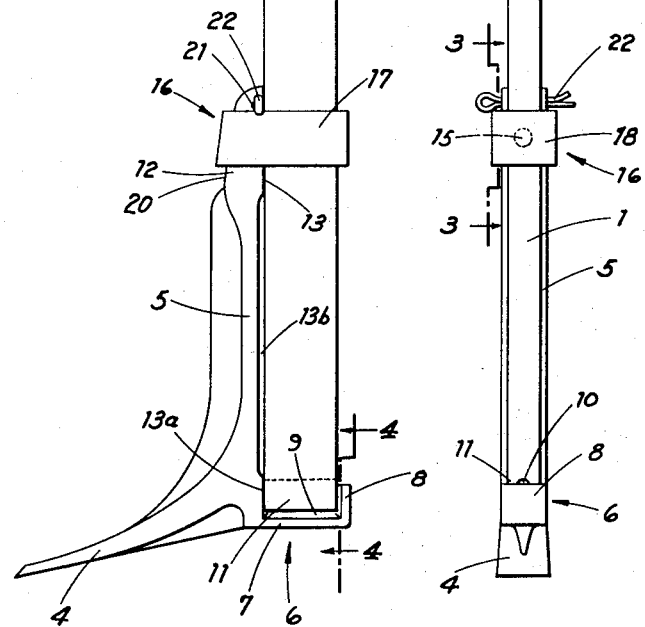
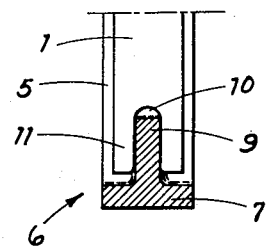
INVENTOR
Jean C. Renault
BY Webster & Webster
ATTYS.

United States Patent Office 2,737,103
Patented Mar. 6, 1956

2,737,103

SOIL CULTIVATING TOOL WITH QUICK-DETACHABLE POINT

Jean C. Renault, Salinas, Calif., assignor to Gabilan Iron and Machine Co., Salinas, Calif., a corporation of California Application June 7, 1954, Serial No. 434,728

2 Claims. (Cl. 97—198)

This invention relates generally to soil cultivating implements.

In particular the invention is directed to, and it is a major object to provide, an improved soil cultivating tool of the type adapted to be mounted in connection with and to depend from, the tool bar of a tractor; one advantage of the invention being that the soil cultivating point can be quick-detached, for replacement or repair, without disturbing the mount for, or the setting of, the point supporting standard which the tool includes.

Another object of the present invention is to provide a soil cultivating tool, as above, wherein the quick-detachable point is normally secured in a fixed but releasable position on the standard by a novel assembly of locating and clamping means; such means including a sliding collar on the standard normally engaging, with a cam action, about a wedging head on the shank of the point.

A further object of the invention is to provide a soil cultivating tool, as in the preceding paragraph, wherein said locating and clamping means further includes a novel, normally engaged but separable fork and heel assembly between the lower ends of the standard and shank of the point.

It is also an object of the invention to provide a soil cultivating tool, with quick-detachable point, which is designed for ease and economy of manufacture, and convenience of use.

Still another object of the invention is to provide a soil cultivating tool, with quick-detachable point, which is practical, reliable, and durable, and yet exceedingly effective for the purpose for which it is designed.

These objects are accomplished by means of such structure and relative arrangement of parts as will fully appear by a perusal of the following specification and claims.

In the drawings:

Fig. 1 is a side elevation of the soil cultivating tool, with quick-detachable point, as in use.

Fig. 2 is a fragmentary, rear elevation of the same.

Fig. 3 is an enlarged fragmentary side elevation, partly broken away and partly in section, on line 3—3 of Fig. 2.

Fig. 4 is an enlarged fragmentary transverse section on line 4—4 of Fig. 1, showing particularly the fork and heel assembly.

Referring now more particularly to the drawings, and to the characters of reference marked thereon, which form a part of this application, the improved soil cultivating tool, with quick-detachable point, comprises an elongated standard 1 which is rectangular in plan; the standard being adapted to be adjustably secured, at its upper end, in connection with the transverse tool bar 2 of a tractor by means of a conventional two-part clamp 3.

The quick-detachable point or cultivating element of the tool is indicated generally at 4, and such point includes a vertical shank 5 normally disposed immediately ahead of the lower portion of the standard 1.

At its lower end the shank 5 is formed, at the back, with a rearwardly projecting heel, indicated generally at 6. The heel 6 includes a horizontal, rearwardly projecting bottom plate 7 of the same width as the shank 5, and a transverse back flange or stop 8 upstands from the rear end of the bottom plate 7 for its full width.

A vertical, longitudinal web 9 is disposed centrally between the side edges of the bottom plate 7 and extends from the back of the shank 5 to the flange 8; such web being integral with the shank 5, bottom plate 7, and flange 8.

At its lower end the standard 1 is formed with a longitudinal notch 10 cut therein from front to rear and opening to the lower end of said standard, whereby to define a fork 11 which normally straddles the web 9 with a relatively close fit.

With the above described fork and heel assembly the point 4 is located in a dead-ahead position, and cannot shift or twist laterally relative to the standard 1. Also, such fork and heel assembly prevents rearward displacement of the lower end of the standard 1 relative to the point 4.

At its upper end the vertical shank 5 of the cultivating point 4 is formed with a wedging head 12 having a vertical rear edge or abutment 13, and at its lower end said shank includes a vertical rear edge or abutment 13a in alinement with the abutment 13, the rear of the shank being forwardly relieved, as at 13b, between said abutments 13 and 13a; all whereby both may normally positively bear flush against the forward edge of said standard 1.

An integral boss 14 projects rearwardly from the edge 13 of head 12 and normally but removably seats in a locating socket 15 formed in the standard 1 and opening to its front edge. This boss and socket arrangement assures that under working conditions the shank 5 cannot displace vertically; thus maintaining the fork 11 in straddling relation to the web 9.

A box clamp in the form of a sliding collar 16, which is generally rectangular in plan, surrounds the standard 1; such sliding collar including side plates 17, a transverse rear plate 18, and a transverse front plate 19.

The sliding collar 16 is normally driven downwardly until it encompasses both the standard 1 and the wedging head 12; the latter having a forwardly and downwardly inclined cam edge 20 at the front. The transverse front plate 19 of the sliding collar 16 is disposed with a substantially matching inclination. Thus, when the sliding collar 16 is driven downwardly to its working position it engages the head 12 with a camming or wedging action; effectively binding said head against the forward edge of the standard 1, maintaining the shank 5 and cultivating point 4 rigidly on the standard 1; i. e., in working position.

In order to prevent accidental displacement of the sliding collar 16 upwardly when the tool is in use, the wedging head 12 is formed, adjacent but short of its upper end, with a transverse, rearwardly opening notch 21, and a cotter pin 22 extends through such notch immediately above the upper edges of the side plates 17, whereby said collar 16 is normally maintained against such displacement.

When it is desired to remove the cultivating point 4 for the purpose of repair or replacement the standard 1 remains in its set position in the clamp 3, and the cotter pin 22 is driven out, whereupon the sliding collar 16 is shifted upwardly on the standard 1 to a position clear of the wedging head 12. Nextly, the wedging head 12 is tilted forwardly until the boss 14 escapes the socket 15, and then the shank 5 is lowered until the web 9 escapes the fork 11. By these simple manipulations, and which can be accomplished without the use of any special tools, the cultivating point can be quickly detached from, or— by a reversal of the steps—quick-attached on, the standard. When attached on the standard 1 the cultivating point is maintained in a rigid, effective working position without possibility of vertical displacement or lateral shifting or twisting.

The standard 1 is of somewhat lesser width from side to side than the vertical shank 5, whereby—when the fork 11 is straddling the centrally disposed web 9—no portion of the standard projects laterally beyond the sides of said shank 5, assuring that there is no soil pressure against the lower portion of the standard when the tool is in use.

Also, the invention is of substantial advantage in that it minimizes the chance of accidental loss of the cultivating point 4 when it is in use in the field.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A cultivating tool comprising a standard, a point projecting ahead of the lower end of the standard, a shank rigid with the point upstanding in front of the standard in engagement therewith, a heel on the shank at its lower end detachably engaging the lower end of the standard in locating relation and arranged to prevent lateral and upward movement of the shank relative to the standard while permitting of forward tilting of the shank at its upper end, a boss on the shank adjacent its upper end projecting rearwardly therefrom and detachably engaged in a socket in the standard to prevent downward movement of the shank, and a vertically movable collar slidable on the standard and over the upper end of the shank to prevent such forward tilting of the shank.

2. A tool, as in claim 1, in which the collar when in a shank holding position lies in the horizontal zone of the boss and socket in shielding relation.

References Cited in the file of this patent

UNITED STATES PATENTS

| | | |
|---|---|---|
| 9,433 | Richardson | Nov. 30, 1852 |
| 465,422 | Barton | Dec. 15, 1891 |
| 775,770 | Herrod | Nov. 22, 1904 |
| 1,273,621 | Kirkpatrick | July 23, 1918 |
| 2,319,048 | Fell | May 11, 1943 |